UNITED STATES PATENT OFFICE.

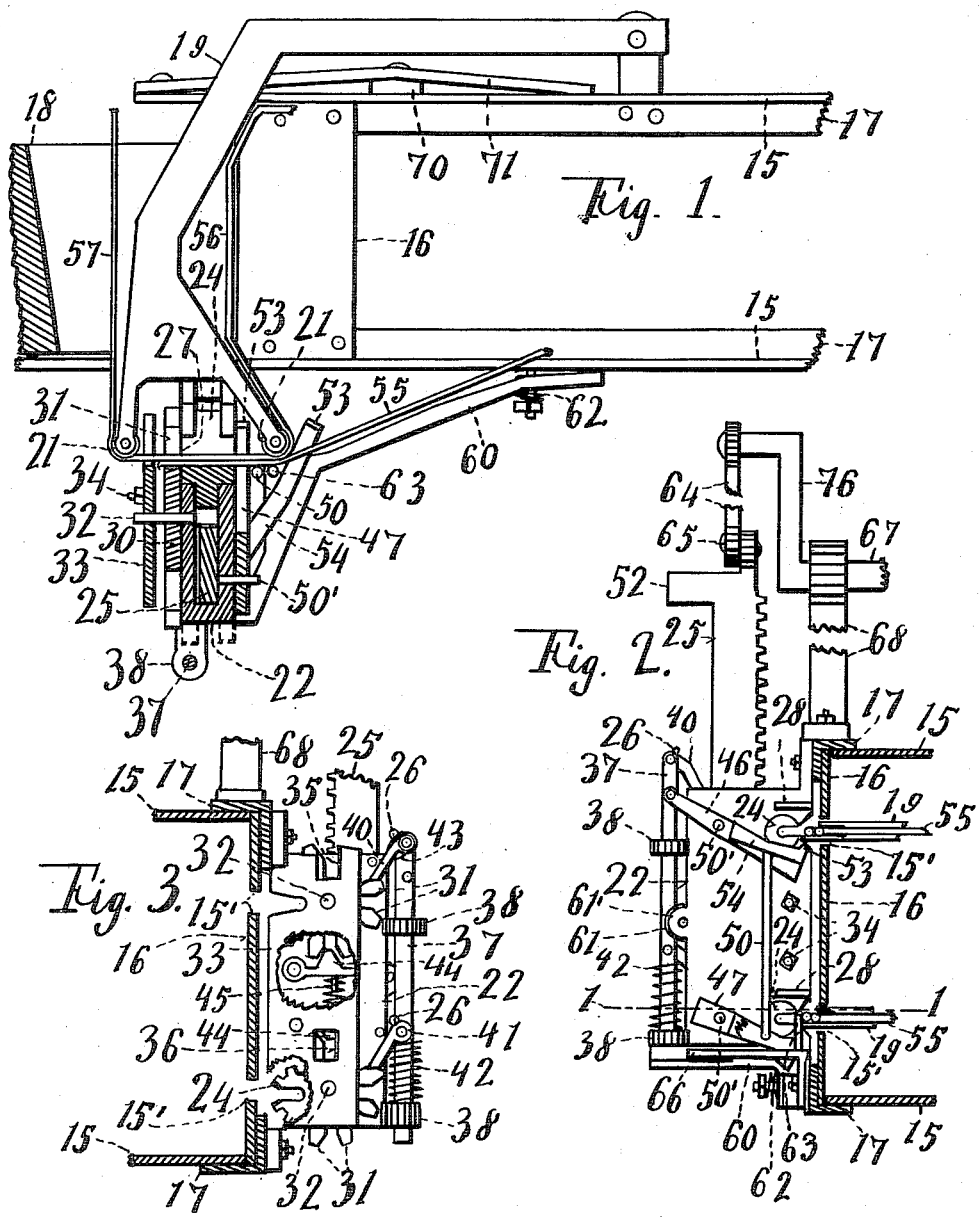

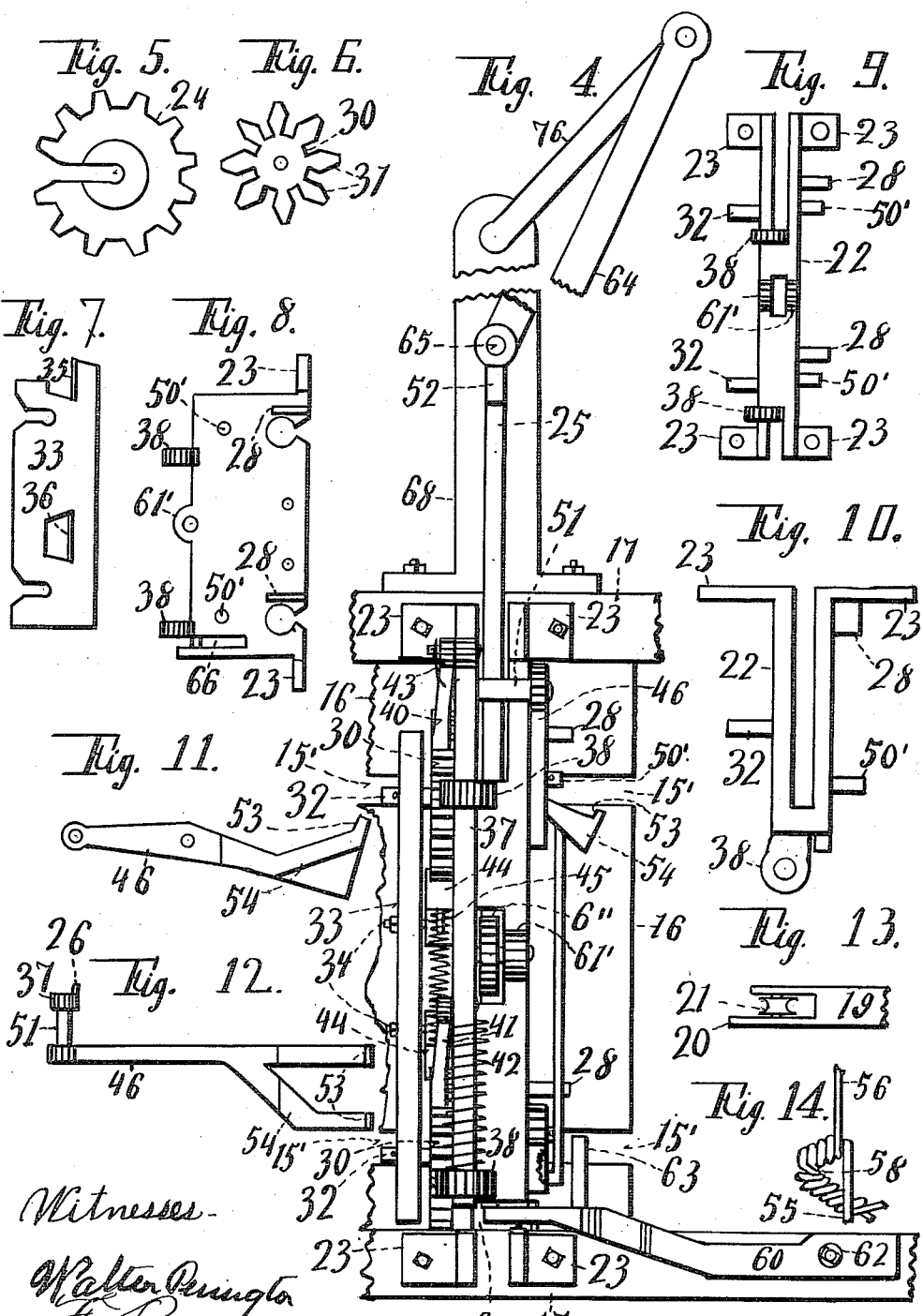

GEORGE SCHUBERT, OF FORT WORTH, TEXAS.

BALE-TYING MECHANISM FOR BALERS.

994,662.

Specification of Letters Patent. Patented June 6, 1911.

Application filed March 11, 1910. Serial No. 548,610.

*To all whom it may concern:*

Be it known that I, GEORGE SCHUBERT, a citizen of the United States, residing at Fort Worth, in the county of Tarrant and State of Texas, have invented a new and useful Bale-Tying Mechanism for Balers, of which the following is a specification.

My present invention relates to a tying mechanism to unite the ends of a tie or wire after said wire has been passed around the bale; and my improvements consist, in designing a simple and light and compact mechanism to be of moderate cost and easy to operate.

In the drawings—Figure 1 is a vertical longitudinal section view of a portion of the body of a baler provided with my improvements, showing a plan view of one of the needles as operated in slots in the throat of the baler and in the bottom of the baler and in slots in the plunger, and showing the tying mechanism in position and in section on line 1—1 on Fig. 2 and enlarged to some extent. Fig. 2 is a rear side view of the tying mechanism as seen when operated on the side of the baler and showing a portion of the body of the baler in section, the outer prong of the lower lever to engage the wire being broken away to show parts beyond in full lines. Fig. 3 is a similar view of the opposite side of said tying mechanism, with a portion of the outer plate broken away to show parts in full lines, and Fig. 4 is an edge view of said mechanism enlarged. Fig. 5 is an enlarged detail view of one of the slotted pinions to twist the wires together. Fig. 6 is a detail view of one of the slotted disks to cut and clamp the wire. Fig. 7 is a detail view of the plate to rest against the wire and the disks. Fig. 8 is a side view of the housing to carry the tying mechanism. Fig. 9 is an edge view of said housing, and Fig. 10 is an end view of said housing enlarged. Figs. 11 and 12 are detail side and edge views of the levers to bend the twisted wire. Fig. 13 is a view of one end of one needle showing the lower lip or projection of said needle, and Fig. 14 is a view of the formed tie.

15, 15 are the top and bottom plates of the body of the baler and 16, 16 are the side plates all secured in position by corner bars 17, 17. 18 is the plunger which is slotted to provide a pass for the needles 19, 19; all arranged as in common use and will be readily understood.

The needles are pivoted to the baler in the usual way, and having their free ends bifurcated or pronged and provided with sheaves 21 to engage and deliver wire through the baler and into the tying mechanism, and also provided with an extension 20 for the purpose later on noted.

22 is a housing secured to the baler by the lugs 23, 23, in position for the needles 19, 19.

24, 24 are slotted pinions journaled in the housing 22.

25 is a rack-bar in the housing 22 engaging with its cogged edge the pinions 24, 24.

61' are lugs to receive a shaft to carry a roller 61" in position to travel on the rear edge of the rack bar 25.

30, 30 are disks having slots or arms 31, and journaled on bosses 32, 32 which are rigid on the housing 22 in position for the slots of said disks to register with the slots of the pinions and the openings of the housing 22.

33 is a plate perforated to receive the bosses 32 and having slots or openings in its edge to register with the slots of the pinions 24, 24, and pressed by the bolts 34, 34 against the sides of the disks and against the wires on the arm of said disks.

35 is a cutting edge formed on the plate 33 and set in to cut the wire off the arms of one of the disks; and 36 is a similar cutting edge to cut the wires off the arms of the other disk.

37 is a rod or bar retained adjustably in lugs 38, 38 which are formed on the housing 22.

40 and 41 are dogs pivoted on the rod 37 in position to engage with the arms 31 of the disks 30.

42 is a spring resting with one end on the lug 38 and with its other end against the dog 41; 43 is a spring coiled on the pivot of the dog 40 and with its ends resting against the dog and the rod in a manner to press the dog to engage the arms of the disk.

26, 26 are stops on the rod 37 to limit the inward movement of the dogs 40 and 41.

44, 44 are catches or locks which are pivoted on the bolts 34 between the plate 33 and the housing 22 and between the disks 30, 30 to engage and lock said disks and pressed into engagement with said disks by a spring 45 which rests on lugs on said catches 44, 44.

46 and 47 are levers pivoted on lugs 50' 50' which are carried by the housing 22, and connected by a rod 50. The lever 46 is connected by a cross bar 51 to the rod 37 and with said cross bar in position to be engaged by a lug 52 which projects from the rack 25. The free or inner ends of the levers 46 and 47 project inward or toward the baler, and with the main or inner prongs close to the ends of the shafts of the slotted pinions 24, 24 and just below the slots when in their normal position and with a small projection 53 on said ends to more readily engage the tie.

54, 54 are prongs of the levers 46 and 47 which project outward to engage the wire 55 on the outside of the needle, the ends of said prongs are also provided with an upward projection 53 to more readily engage the wire.

60 is a lock lever pivoted on the baler back of the tying mechanism and extending with its free end into a slot 66 in the lower end of the housing 22 and bent to extend below the lever 47 and prong 54 to near the baler and provided with a lug 63 to be engaged by the projection 20 on the inner or rear prong of the needle and the lever is pressed toward said needle by a spring 62 which is coiled on the lever 60.

64 is a connecting rod pivoted on a lug 65 on the upper end of the rack bar 25 and with its other end pivoted on a crank 76 and with the crank shaft 67 journaled in a bracket 68 which is secured to the baler in any desirable manner and preferably in line with the rack bar 25.

70 is a cross bar secured on the baler a short distance back of the throat of the baler.

71 are bars secured near their center on the bar 70 and resting with their rear ends on the baler and with their front ends on the throat of the baler to reëmbrace or reinforce the slotted throat of the baler.

In operating the mechanism: the wire having been drawn in by the forming bale, and resting in front of the needles; and after the bale is of the desired size and the plunger is nearing the inner end of its stroke the needles are shifted inward, (by means not shown,) and through the baler and through the slots of the plunger and to the position seen in Fig. 1 and delivering the wires in to the tying mechanism, and as the needles near said position the projection 20 of one of the needles, (the far or lower one in the present instance,) will move against the lug 63 and shifting it outward and shifting the free end of the lever 60 from under the rack bar 25 after which the rack bar will be moved downward, as indicated in Fig. 4, by rotating the crank shaft 67, by mechanism not shown, and as the rack bar 25 moves downward it will rotate the slotted pinions 24, 24 and twist the wires together; and as the rack bar 25 nears the end of its downward movement the lug 52 engages the bar 51 and moves it downward and shifts the rod 37 in the same direction and the dogs 40 and 41 will rotate the disks 30, 30 the distance of one arm 31 (one eighth of a turn in the present instance,) and cause one arm of each disk 30 to engage the wires and cut said wires off at 27 against the end of the shaft of the slotted pinions 24 and also drawing in between the plates 33 and the arms 31, 31 the wires 57 and retaining said wires for the next bale. As soon as the disks have started to rotate and sheared off the wires the levers 46 and 47 will engage the wires and shift said wires upward partly withdrawing the wires from the slotted pinions 24, 24 and bend the twisted tie to near a right angle as seen at 58 by pressing the twist against the bracket 28, 28, and the prong 54 also retaining the wire 55 until drawn out by the expanding bale; as the cross bar 51 moves against the upper lug 38 the downward movement of the rack bar 25 is stopped and at that time the slots of the pinions 24, 24 will register with the slots 15′, 15′ and the needles and plunger being withdrawn, (by means not shown,) and the tie is withdrawn from the tying mechanism by the expanding bale. Namely; by drawing or pulling the wires 55 and the twists off the projections 53 53 of the levers 46 and 47 and their prongs 54, by the force of the expanding or moving bale, and by this means bend the twisted tie and the wire 55 to an acute angle as shown in Fig. 14. And as the next bale forms the wire 57 is drifted back and engaging the slots of the pinions 24, 24 and becomes the wire 55. After the wire 55 is in the slots of the pinions 24, 24 the rack bar 25 is shifted back, (by means not shown,) until the lower end on the rack bar 25 again rests on the lock lever 60 which is moved back by the spring 62 as soon as the needle retreats, at which time the slots of the pinions 24, 24 will again register with the slots 15′ 15′, and as the rack bar 25 is raised the spring 42 will raise the rod 37 and cause the dogs 40 and 41 to engage the next arm of the disks 30, 30 and also shift the levers 46 and 47 to the position as seen in Fig. 2, after which the operation above described is repeated.

As the disks 30, 30 are rotated the wires on the arms of said disks are cut off said arms by the cutting edges 35 and 36 on the plate 33 and drop out of the way.

It will be noticed that the tying mechanism herein described can be applied to the side of the baler or underneath the baler as may be desired; and if applied as shown in Fig. 1 the needle will aid in tucking down the lip of the bale and said lip will also be tied in.

Having described my invention; what I claim is—

1. In a tying mechanism, a housing adjacent the baler, slotted pinions in said housing, means to deliver wires around the bale and to the slotted pinions, a rack bar to operate said pinions, levers arranged to bend said twisted tie and partly retain said twisted tie until withdrawn.

2. In a tying mechanism, a housing adjacent the baler, lugs on said housing, slotted pinions in said housing, means to deliver wires around the bale and to the slotted pinions, a rack-bar to operate said slotted pinions to twist the wire together, levers arranged to bend said twisted tie by pressing it against projecting lugs.

3. In a tying mechanism, a housing adjacent the baler, slotted pinions in said housing, means to deliver wires around the bale and to said slotted pinions, a rack bar to operate said slotted pinions to twist the wires together, levers arranged to bend the twisted tie, and means on said levers to engage the single strand beyond the tie and retain said tie until withdrawn by superior energy.

4. In a tying mechanism, a housing adjacent the baler, slotted pinions in said housing, means to deliver wires around the bale and to said slotted pinions, a rack bar to operate said slotted pinions to twist the wires together, slotted disks adjacent the housing, a plate extending over said disks, and means to operate said disks to cut and clamp the wires.

5. In a tying mechanism, a housing adjacent the baler, slotted pinions in said housing, means to deliver wires around the bale and to the slotted pinions, a rack bar to operate said slotted pinions to twist the wires together, slotted disks adjacent the housing, a plate extending over said disks, means to operate said disks to cut and clamp the wires, cutting edges on the plate to cut the wires off the said disks.

6. In a tying mechanism, a housing adjacent the baler, slotted pinions in said housing, means to deliver wires around the bale and to the slotted pinions, a rack bar to operate said slotted pinions to twist the wires together, slotted disks adjacent the housing to cut the wires, a rod carried by the housing, dogs on said rod to operate the slotted disks, and means to operate the rod.

7. In a tying mechanism, a housing adjacent the baler, slotted pinions in said housing, means to deliver wires around the bale and to the slotted pinions, a rack to operate said slotted pinions to twist the wires together, slotted disks adjacent the housing to cut and clamp the wires, a rod carried by said housing, dogs on said rod to operate the slotted disks, a bar on said rod, a lever connected to said bar to bend the twisted tie, and means to operate the rod.

8. In a tying mechanism, a housing adjacent the baler, slotted pinions in said housing, means to deliver wires around the bale and to the slotted pinions, a rack bar to operate said slotted pinions to twist the wires together, slotted disks adjacent the housing to cut and clamp the wires, a rod carried by said housing, dogs on said rod to operate the slotted disks, a spring to shift the rod in one direction, and means to shift the rod in the opposite direction.

9. In a tying mechanism, a housing adjacent the baler, slotted pinions in said housing, means to deliver wires around the bale and to the slotted pinions, a rack bar to operate said slotted pinions to twist the wires together, slotted disks adjacent the housing to cut and clamp the wires, means to lock said disks, a rod carried by said housing, dogs on said rod to engage and operate said disks, a spring to shift the rod in one direction, and means to shift the rod in the opposite direction.

10. In a tying mechanism, a housing adjacent the baler, slotted pinions in said housing, means to deliver wires around the bale and to the slotted pinions, rack bars to operate said slotted pinions to twist the wires together, a lever adapted to engage the rack bar, and means on the lever to be disengaged from said rack bar.

11. In a tying mechanism of the kind described, a needle or needles adapted to deliver wire across the baler in front of the bale, a projection on the lower side of the needles extending a proper distance beyond the sheave to prevent the wire from dropping below the needles and to unlock the tying mechanism.

GEORGE SCHUBERT.

Witnesses:
J. G. ESTES,
W. L. PURSCH.